United States Patent [19]
Tanaka

[11] 3,885,594
[45] May 27, 1975

[54] REINFORCED FLEXIBLE PIPE

[75] Inventor: Kenichi Tanaka, Tokyo, Japan

[73] Assignee: Kakuichi Mfg. Co., Ltd., Ueda, Japan

[22] Filed: May 20, 1974

[21] Appl. No.: 471,807

Related U.S. Application Data

[63] Continuation of Ser. No. 240,209, March 31, 1972, abandoned.

[30] Foreign Application Priority Data

| | | |
|---|---|---|
| Jan. 17, 1972 | Japan | 47-6204 |
| Jan. 17, 1972 | Japan | 47-6205 |
| Jan. 27, 1972 | Japan | 47-9434 |

[52] U.S. Cl............................ 138/129; 138/132
[51] Int. Cl............................... F16l 11/08
[58] Field of Search............ 138/122, 125, 129, 132, 138/144, 150, 154, DIG. 7, 174, 118, 141, 153

[56] References Cited
UNITED STATES PATENTS

| | | | |
|---|---|---|---|
| 2,810,424 | 10/1957 | Swartswelter et al. | 138/DIG. 7 |
| 3,548,882 | 12/1970 | Rinker | 138/129 |

FOREIGN PATENTS OR APPLICATIONS

| | | | |
|---|---|---|---|
| 905,767 | 9/1962 | United Kingdom | 138/129 |

*Primary Examiner*—Samuel B. Rothberg
*Assistant Examiner*—Steven L. Stephan
*Attorney, Agent, or Firm*—Stevens, Davis, Miller & Mosher

[57] ABSTRACT

A reinforced flexible pipe comprises a tubular wall formed of a soft synthetic material, and a reinforcing spiral core of a hard synthetic resin material. The reinforced spiral core has a substantially I-shaped section and is partly exposed out of the pipe wall. The pipe is constructed by welding the adjoining lateral edges of an elongated strip in abutting relation, the strip being formed of a soft synthetic material and of a reinforcing spiral core of a hard synthetic resin material having a substantially I-shaped section and being partly exposed out of the strip. The apparatus comprises an endless belt obliquely wound around a mandrel at an angle substantially equal to a pitch angle of the reinforcing spiral of the hard synthetic resin material. The strip is fed in a tangential direction onto the endless belt and moved axially forwardly on the endless belt at the constant pitch angle as the endless belt is rotated around the mandrel.

4 Claims, 17 Drawing Figures

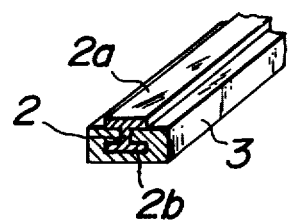
FIG_1b
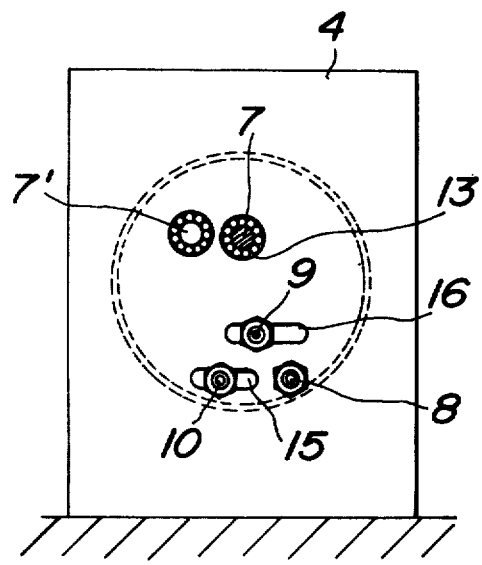
FIG.9

FIG_3
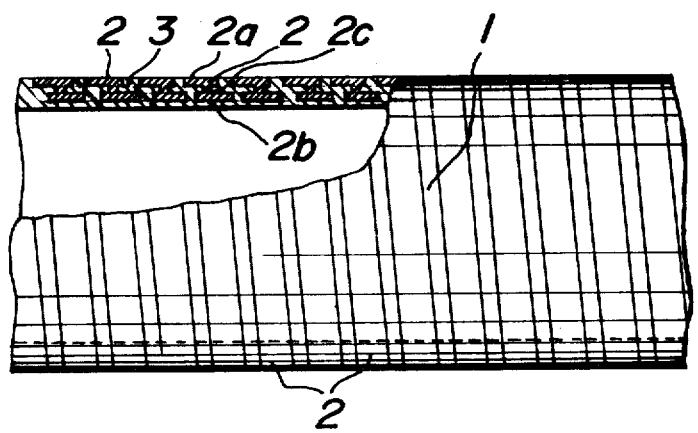
FIG_4
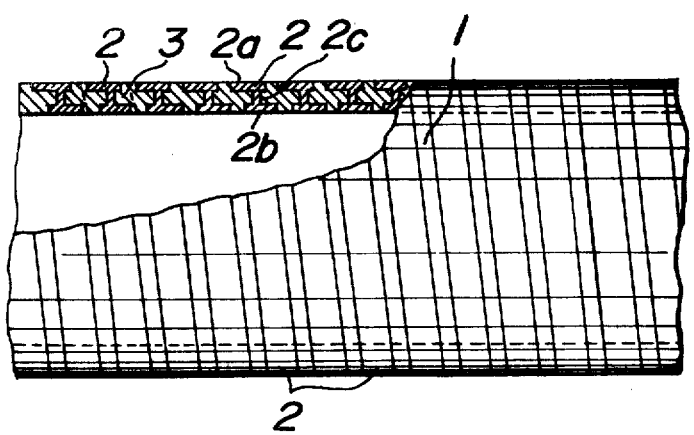

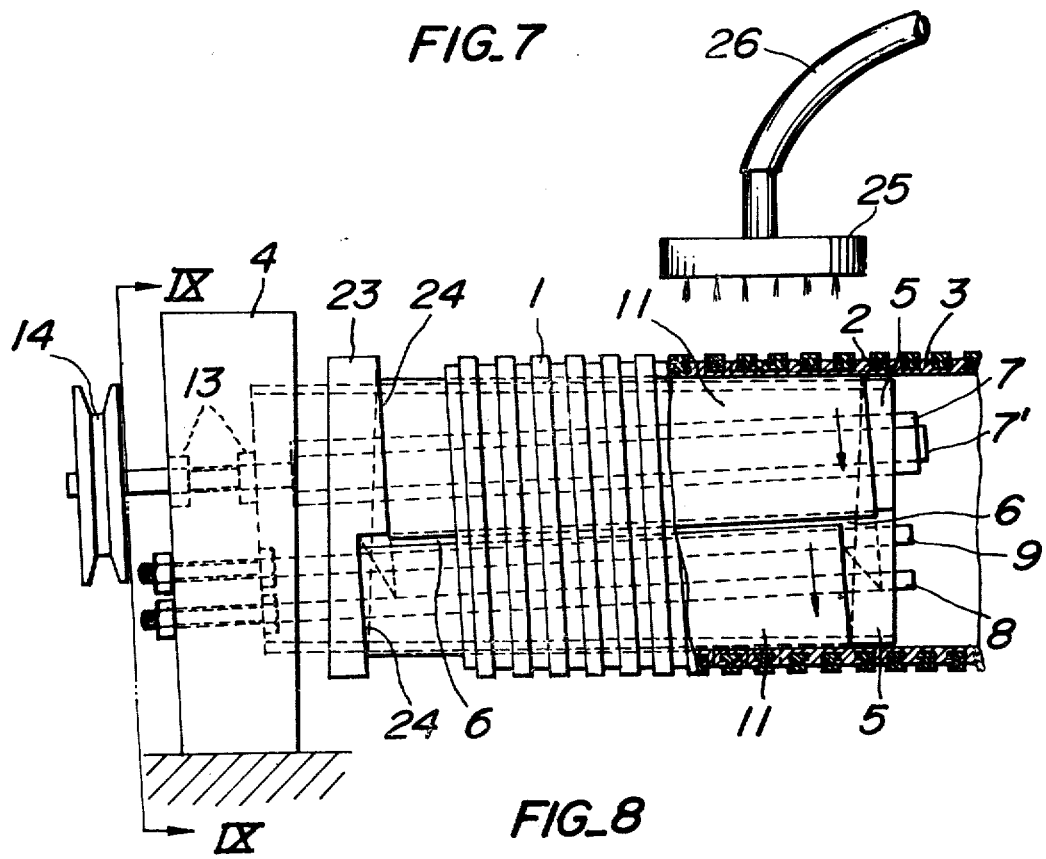
FIG_7
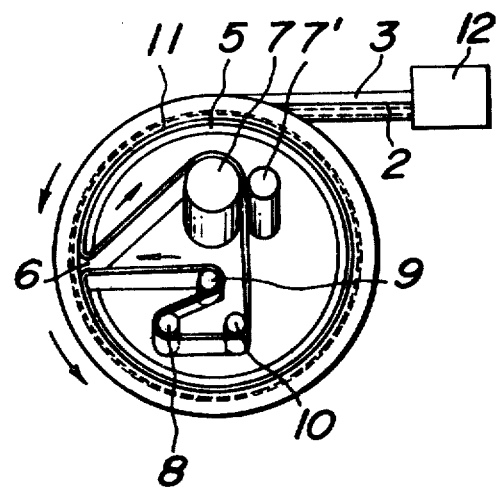
FIG_8

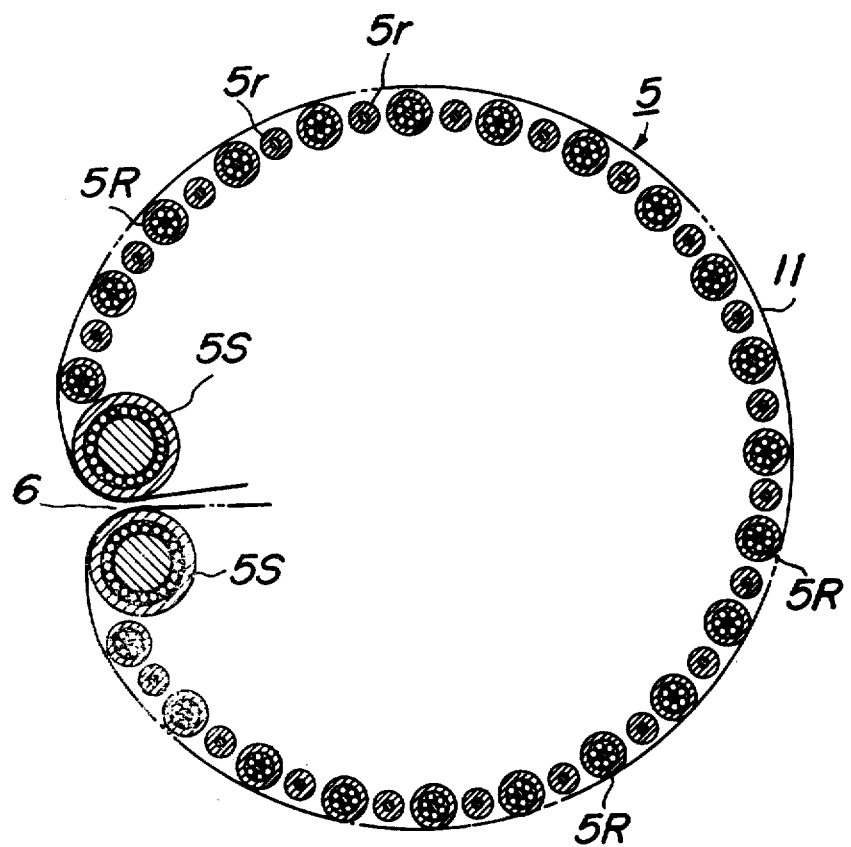

FIG_13a
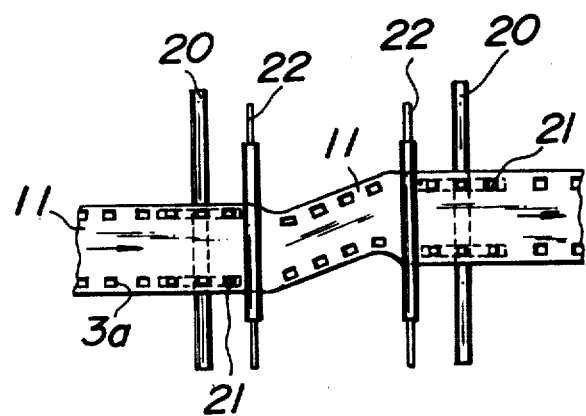
FIG_13b
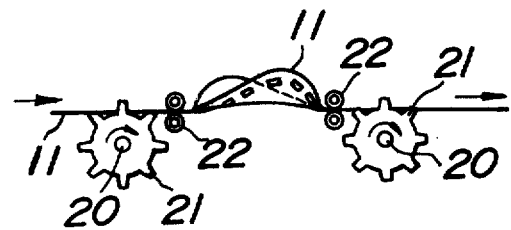

REINFORCED FLEXIBLE PIPE

This is a continuation, application Ser. No. 240,209 filed 3-31-72 now abandoned.

This invention relates to a reinforced flexible pipe, the method of continuously manufacturing the pipe, and to apparatus for carrying out the method of manufacture.

Many attempts have been made to provide a reinforced flexible pipe having a reinforcing spiral core of a hard synthetic resin material extending throughout the length of the pipe. But, hitherto none has led to fully satisfactory results, that is, a reinforced flexible pipe having excellent flexibility and high compressive stress and abrasion wear resistant properties without fear of stripping the reinforcing spiral core of a hard synthetic resin material from the pipe after long use.

Heretofore, it has been proposed to manufacture the above mentioned kind of reinforced flexible pipe by rotating a steel pipe having an outer diameter which is equal to the inner diameter of the formed pipe, moving forwards said rotating steel pipe forward in the axial direction thereof, helically winding a synthetic resin tape including a reinforcing core embedded therein about the outer periphery of said rotating and forward moving steel pipe, cooling or polymerizing said synthetic resin tape and finally withdrawing said steel pipe out of the formed pipe. This method ensures a strict holding of the synthetic resin pipe with the aid of the steel pipe until the synthetic resin pipe is cooled or polymerized so that it provides the advantage that the formed pipe is stable in its dimensions. This method, however, has the disadvantage that in manufacturing a long pipe provision must be made a complex and expensive apparatus for driving the steel pipe and withdrawing it from the formed pipe, and it is necessary to operate this apparatus with a maximum of time and labor.

Another method has been proposed in which a plurality of rollers are arranged at corners of a regular polygon and are inclined at an angle which is equal to the pitch angle of a synthetic resin strip to be helically wound around these rollers. Then, a synthetic resin strip including a reinforcing core embedded therein is helically wound about these rollers and is moved forward along these rollers and formed into a pipe at the forward ends of the rollers where the outer periphery of an envelope substantially tracing the corners of the regular polygon becomes a circle. The inner diameter of the formed pipe is unstable at that time. Moreover, the synthetic resin tape becomes elongated during cooling or polymerization, with the result that the inner wall of the formed pipe is subjected to strain. A further method has been proposed in which a number of flat belts each having a small width are arranged side by side around the outer periphery of a cylinder in the lengthwise direction thereof and then a synthetic resin tape including a reinforcing core embedded therein is helically wound about these flat belts and is successively drawn off of these belts. This conventional method has the disadvantage that the joints between the flat belts are imprinted on the inner wall of the formed pipe, thus degrading the product pipe.

An object of the invention is to provide a reinforced flexible pipe of substantially uniform wall thickness, and having a homogeneous reinforcing core having substantially I-shaped section and wound along a helical path and partly exposed out of the pipe wall, which is resistant to compressive stress and abrasion wear after long use.

Another object of the invention is to provide a method of manufacturing the reinforced flexible pipe in a very easy, reliable and speedy manner.

A further object of the invention is to provide an apparatus for manufacturing the above pipe, which is simple in construction and reliable in operation and is capable of manufacturing the reinforced flexible pipe in a very easy and speedy manner.

The above and other objects of the invention will become more apparent from the following description and accompanying drawings, in which:

FIG. 1b is a perspective view showing a continuous strip;

FIGS. 2 to 6 are fragmentary cross-sectional views of modified embodiments according to the invention;

FIG. 7 is a front elevation and partly a sectional view of an apparatus for manufacturing a reinforced flexible pipe according to the invention;

FIG. 8 is its end view;

FIG. 9 is a section on line IX—IX of FIG. 7;

FIG. 10 is a sectional view of another embodiment of a mandrel;

FIGS. 11a to 13a are plan views of various embodiments of guide rollers; and

FIGS. 11b to 13b are front elevations thereof.

Figure 1A:
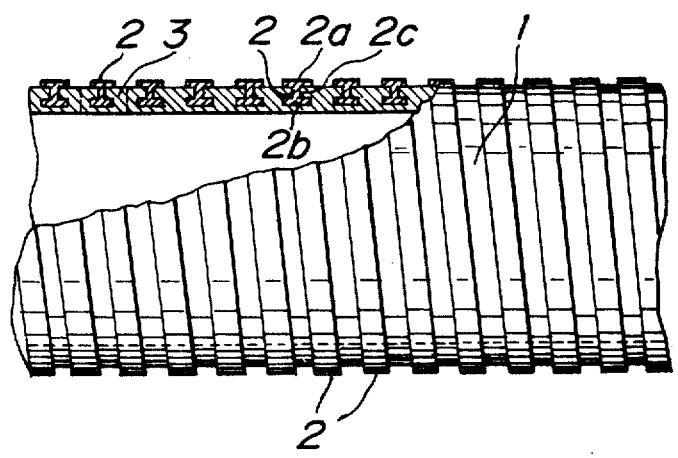
FIG. 1a is a fragmentary cross-sectional view of an embodiment of a reinforced flexible pipe according to the invention.

Referring to FIG. 1a, 1 designates an embodiment of a reinforced flexible pipe according to the invention. The pipe 1 comprises a tubular wall formed of a soft synthetic resin material, and a reinforcing spiral core 2 of a hard synthetic resin material having a substantially I-shaped cross section. The reinforcing spiral core 2 extends throughout the length of the pipe 1 and the upper leg 2a of the I-shaped core 2 is exposed out of the tubular wall and the lower leg 2b is embedded therein.

The flexible pipe 1 is constructed by helically winding a continuous strip 3 shown in FIG. 1b at a constant pitch about an endless belt rotating around a mandrel (not shown), said strip entering upon leaving from the mandrel and whereupon the lateral edges of the strip 3 are welded in an abutting relationship as shown by dotted lines in FIG. 1a.

The strip 3 is formed of a soft synthetic resin material and of a reinforcing hard synthetic resin material core 2 extending throughout the length of the strip 3 and having a substantially I-shaped cross section whose upper leg 2a is exposed out of the strip 3 and lower leg 2b is embedded therein.

As seen from the above, the outer peripheral wall of the pipe 1 mainly consists of the upper legs 2a of the I-shaped core 2 so that the pipe 1 has improved compressive stress and wear resistant properties. Moreover, the I-shaped core 2 is firmly bonded to the pipe wall with the aid of the material surrounding the web portion 2c, with the result that there is no risk of the I-shaped core 2 being stripped from the pipe wall by rough handling. Since the adjoining lateral edges of the strip 3 are welded in an abutting relation, the pitch of the helically wound strip 3 can be made substantially constant. This prevents the pipe 1 from being subjected to strain in its lengthwise direction.

As the synthetic resin material, use may be made of any thermo-plastic or thermosetting materials or mixtures thereof, or natural and synthetic rubbers and their mixtures with synthetic resins. It is preferable to use vinyl chloride. Such synthetic resin material may be made soft or hard as desired by means of conventional treatments.

Figure 2:
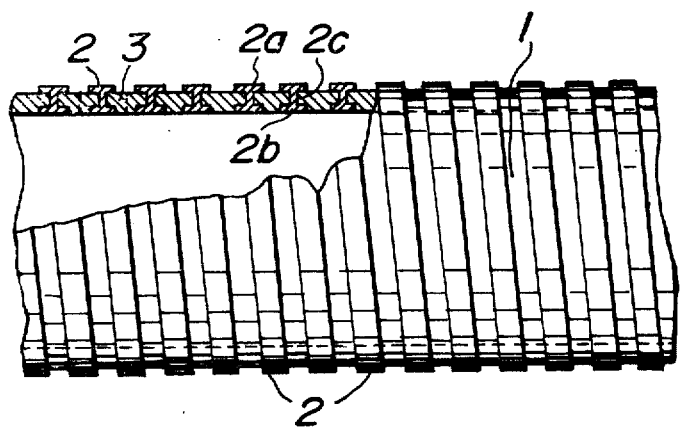

In the embodiment shown in FIG. 2, the lower leg 2b of the I-shaped core 2 is exposed in flush relationship with the inner wall of the pipe 1. Thus, the inner wall of the pipe 1 is made smooth even though the lower leg 2b is exposed at the inner wall of the pipe 1.

In the embodiment shown in FIG. 3, the upper and lower legs 2a and 2b of the I-shaped core 2 are displaced in opposite directions, respectively. The upper leg 2a is exposed in flush relationship with the outer periphery of the pipe 1.

In the present embodiment, the lateral edges of the strip 3 are inclined as shown by dotted lines in FIG. 3 by an angle determined by the modified configuration of the I-shaped core 2.

This modified embodiment permits enlargement of the width of the upper and lower legs 2a, 2b of the I-shaped core 2, hence obtaining a flexible pipe having excellent compressive stress and abrasion wear resistant properties.

In the embodiment shown in FIG. 4, the lower leg 2b of the modified I-shaped core 2 is made in flush relationship with the inner wall of the pipe 1 and is exposed.

Figure 5:
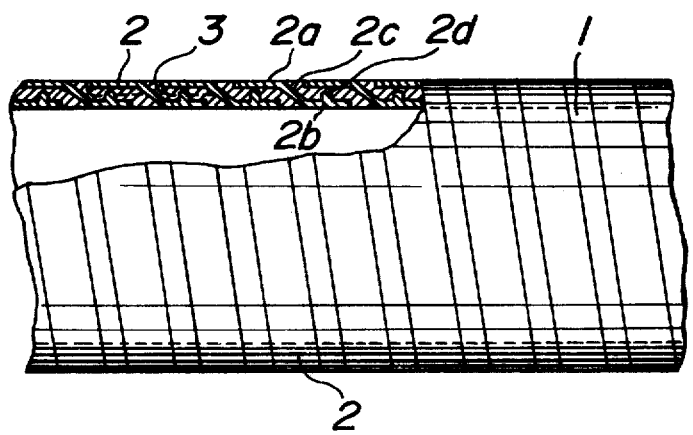

In the embodiment shown in FIG. 5, the opposite ends of the upper and lower legs 2a and 2b of the I-shaped core 2 are connected by an inclined web 2c and the lower leg 2b is provided with a rib 2d projecting towards the upper leg 2a. Both the upper and lower legs 2a and 2b are in flush relationship with the outer and inner peripheries of the pipe 1 and exposed out of them, respectively.

Figure 6:
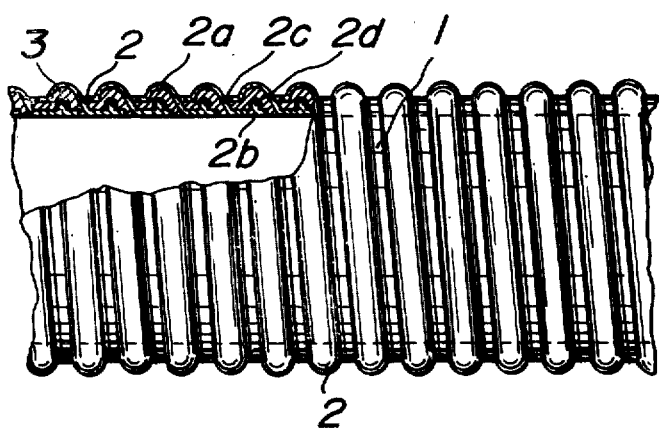

In the embodiment shown in FIG. 6, the upper leg 2a of the core 2 is made semi-circular in cross section and projected out of the outer periphery of the pipe 1, and the lower leg 2b is provided with a rib 2d as in the embodiment shown in FIG. 5.

In the embodiments shown in FIGS. 5 and 6, the rib 2d facilitates bonding of the reinforcing core 2 firmly to the soft synthetic resin material 3. The rib 2d may be formed on the upper leg 2a or on both upper and lower legs 2a and 2b, respectively.

The flexible pipes shown in FIGS. 2 to 6 are constructed starting from the strip 3 shown between dotted lines in the respective drawing in the same manner as that explained with reference to FIGS. 1a and 1b.

As stated hereinbefore, the invention provides a reinforced flexible pipe with improved compressive stress and abrasive wear resistant properties without significantly affecting flexibility. Therefore, the invention contributes greatly to the industry.

Now, the method of manufacturing the reinforced flexible pipes shown in FIGS. 1 to 6 and apparatus for carrying out the method of manufacture will be described with reference to FIGS. 7 to 9.

In FIGS. 7 to 9 there is shown an apparatus for manufacturing a reinforced flexible vinyl chloride pipe 1. The apparatus comprises a supporting frame 4, a mandrel 5 supported at its one end by the supporting frame 4. The mandrel 5 is provided at its outer periphery with a slit 6 extending throughout the mandrel 5 in its lengthwise direction. The apparatus further comprises a plurality of guide rollers 7, 8, 9, 10 arranged in the mandrel 5. Each of these guide rollers is rotatably journalled at one end by the supporting frame 4. The roller 7 is operable as a driving roller or the roller 10 is operable as a tension roller.

An endless belt 11 is obliquely wound around the mandrel 5 at an angle substantially equal to the pitch angle of the reinforcing spiral of the hard synthetic resin material core 2. The endless belt 11 extends throughout the mandrel 5 and enters into and leaves the mandrel 5 through the slit 6 and passes across the guide rollers 7, 8, 9, 10. The strip 3 is fed in a tangential direction onto the endless belt 11 from a feeding device 12 in which the strip 3 with the reinforcing core 2 is formed beforehand. The diameter of the mandrel 5 is determined such that the outer diameter of the endless belt 11 wound obliquely about the mandrel 5 is substantially equal to the inner diameter of the formed flexible pipe 1. The slit 6 is inclined by an angle substantially equal to the pitch angle of the flexible pipe 1 from the axis of the mandrel 5. The slit 6 has a length which is longer than the sum of the width of the endless belt 11 and one pitch width of the flexible pipe 1.

Another embodiment of the mandrel 5 is shown in FIG. 10 in which only the mandrel 5 is shown and members other than the mandrel 5 are omitted for ease of explanation. A number of rollers 5R each rotatably journalled by ball bearings and rollers 5r each having a reduced diameter are arranged alternately along a circle. The endless belt 11 corresponds to an envelope shown by dot-dash lines and substantially traces a circle with the exception of the slit 6. The reduced rollers 5r serve to prevent the endless belt 11 wound about the roller 5R from taking an unduly depressed position. The slit 6 is formed between two rollers 5S and 5S each rotatably journalled by ball bearings. The present mandrel 5 constructed by a number of rollers 5R each rotatably journalled by ball bearings and arranged along the circle, makes it possible to remarkably improve slidability of the endless belt 11 which is driven by the driving roller 7 and moves along the outer periphery of the mandrel 5.

The driving roller 7 and the guide rollers 8, 9 are arranged in the mandrel 5 and rotatably journalled in and supported by the supporting frame 4.

The driving roller 7 may be made of rubber or steel and is made preferably large in diameter and supported through ball bearings 13 by the supporting frame 4 in a position substantially parallel with the slit 6. The driving roller 7 is driven through a pulley 14 by a motor (not shown). If the driving roller 7 is made of steel, its surface is worked by a knurling tool to increase its friction with the endless belt 11. Provision may be made of an auxiliary roller 7' which serves to prevent the endless belt 11 from slipping. The tension roller 10 is supported through an oblong hole 15 by the supporting frame 12.

The guide rollers 8, 9 may be made of steel bars and are arranged parallel to each other within the mandrel 5, while the guide roller 8 and the tension roller 10 are located on a plane. The guide roller 9 and the slit 6 are located on a plane. These two planes are arranged parallel to each other.

Figure 11A:
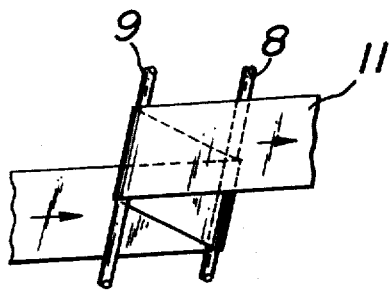
Figure 11B:
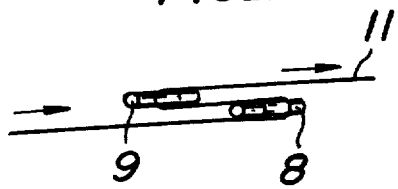
Figure 12A:
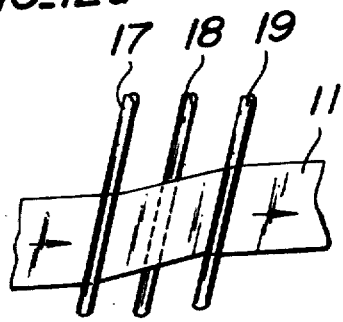
Figure 12B:
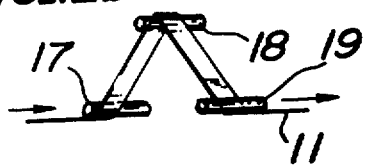

The guide rollers 8 and 9 arranged parallel each other may be inclined at a suitable angle to the axial direction of the endless belt 11 so as to move the endless belt 11 in the axial direction of the mandrel 5 as shown in FIGS. 11a and 11b. The guide roller 9 may be supported by an oblong hole 16 to adjust the spacing between the guide rollers 8 and 9 as shown in FIG. 9. Three guide rollers 17, 18 and 19 may be provided as shown in FIGS. 12a and 12b. In this case, the three guide rollers 17, 18 and 19 are arranged parallel to each other and may be inclined at a suitable angle to the width of the endless belt 11 to advance the endless belt 11 in the axial direction of the mandrel 5.

If the endless belt 11 is made of a rigid material such as steel, it is preferable to use sprocket wheels as the guide rollers. In such a case, a combination of two sets of shafts 20 having a sprocket wheel 21 secured thereto and rollers 22 ensure a forced advance of the endless belt 11 in the axial direction of the mandrel 5. Both the driving of the endless belt 11 and the movement thereof in the axial direction of the mandrel 5 may be performed by connecting the shaft 20 to a driving motor (not shown). In this case, the driving roller 7 shown in FIGS. 7 to 9 may serve only as a guide roller.

The endless belt 11 may be made of a cloth covered with ethylene fluoride or made of steel. The endless belt 11 is drawn through the slit 6 in a direction perpendicular thereto onto the outer periphery of the mandrel 5 and moved along the outer periphery of the mandrel 5 and returned again to the slit 6. Thus, the lengthwise direction of the endless belt 11 is perpendicular to the slit 6 so that the angle of the endless belt 11 inclined from the circumferential line of the mandrel 5 is equal to the pitch angle of the formed flexible pipe 1. The endless belt 11 is drawn through the slit 6 at its position A out of the mandrel 5, and enters, through the slit 6 at its position B forwarded separated from the position A by one pitch of the formed flexible pipe 1, into the mandrel 5 as shown in FIG. 7. The endless belt 11 entered into the mandrel 5 crosses the driving roller 7 in a direction perpendicular to the axis thereof and driven by it at a constant speed. The direction of travel of the endless belt 11 before crossing over the guide roller 8 is parallel with that after leaving the guide roller 9, but the endless belt 11 moves in the axial direction of the mandrel 5. The width of this movement of the endless belt 11 from the position A to the position B may be adjusted by displacing the guide roller 9 in the oblong hole 16.

The above mentioned construction permits the endless belt 11 to rotate along the outer periphery of the mandrel 5 at a constant pitch.

The mandrel 5 is provided at its end facing the supporting frame 4 with a guide ring 23 having an end surface 24 inclined at the same pitch angle as that of the endless belt 11 with respect to the mandrel 5. The guide ring 23 serves to prevent the endless belt 11 from displacing towards the supporting frame 4 due to the reaction produced when the formed flexible pipe 1 is fed from the mandrel 5. The mandrel 5 is provided above its free end with a sprinkler 25 connected through a conduit 26 to a cooling water supply source (not shown).

The operation of the above mentioned apparatus is as follows. When the driving roller 7 is rotated by a motor (not shown), the endless belt 11 travels as shown by arrows in FIGS. 7 and 8 and is displaced forward in the axial direction by one pitch along the outer periphery of the mandrel 5 and displaced rearward in the axial direction by one pitch in the mandrel 5. This forward and rearward displacement of the endless belt 11 are repeated each time the endless belt 11 makes a round of the mandrel 5. Then, onto the outer peripheral surface of the rotating endless belt 11 at its side facing the supporting frame 4 is fed from the feeding device 12 the soft vinyl chloride strip 3 provided with reinforcing core 2, immediately after it has been formed. The strip 3 is carried by the endless belt 11. When the strip 3 arrives at the slit 6 it is separated from the endless belt 11 which enters into the mandrel 5 and rides on the endless belt 11 coming through the slit 6 out of the mandrel 5. Thus, the strip 3 is fed forward by one pitch at each time the endless belt 11 makes one revolution about the mandrel 5 and comes into abutment at its one side edge with the side edge of a newly supplied strip 3 is and thermally welded together into a formed pipe. The formed pipe is fed in the axial direction while helically rotating and is then cooled by the cooling water from the sprinkler 25 and finally leaves the mandrel 5, thereby obtaining a continuous extended length of flexible pipe 1.

The above mentioned apparatus makes it possible to manufacture flexible pipes having different pitches by varying the inclinations of the slit 6 of the mandrel 5, of the driving roller 7 and tension roller 10, by varying the space between the guide rollers 8 and 9 and by replacing the guide ring 23 for a new one having a different pitch angle.

It is seen that the reinforced flexible pipe, method and apparatus of the invention as shown and described fully satisfy all of the objects herein above set forth. Obviously, many modifications and variations of the invention are possible in the light of the above teachings. It is, therefore, to be understood that within the scope of the appended claims the invention may be practiced otherwise than as specifically shown and described.

What is claimed is:

1. A reinforced flexible pipe comprising a tubular wall formed of a soft synthetic resin material, and a reinforcing spiral core of a hard synthetic resin material having a substantially I-shaped cross-section and extending throughout the length of said pipe, partly exposed out of said wall and intimately bonded thereto, the adjoining lateral edges of an elongated strip being welded together in abutting relation so as to integrally form said wall, said strip being formed of a soft synthetic resin material and of a reinforcing hard synthetic resin material core extending throughout the length of said strip and having a substantially I-shaped cross-section and being partly exposed out of said strip.

2. A reinforced flexible pipe according to claim 1, wherein said hard synthetic material and said soft synthetic resin material comprise vinyl chloride.

3. The reinforced flexible pipe of claim 1, wherein the I-shaped cross-sectioned material is exposed only on the exterior of the pipe wall.

4. The reinforced flexible pipe of claim 1, wherein the I-shaped cross-sectioned material is exposed on the exterior of the pipe wall, and contiguous the interior surface of the pipe wall.

* * * * *